Jan. 8, 1946.　　　P. E. HAWKINSON　　　2,392,667
TIRE BUFFING MACHINE
Filed June 7, 1944　　　3 Sheets-Sheet 1

Inventor
Paul E. Hawkinson
By Merchant & Merchant
Attorneys

Jan. 8, 1946.   P. E. HAWKINSON   2,392,667
TIRE BUFFING MACHINE
Filed June 7, 1944   3 Sheets-Sheet 2
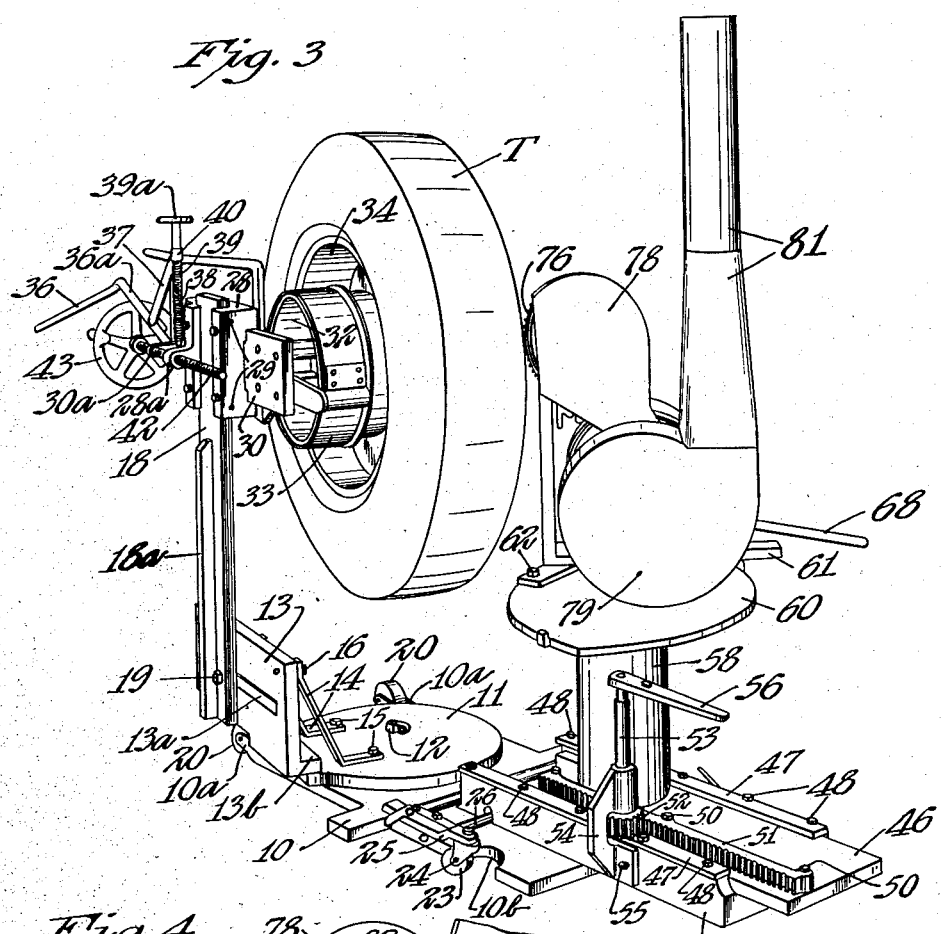
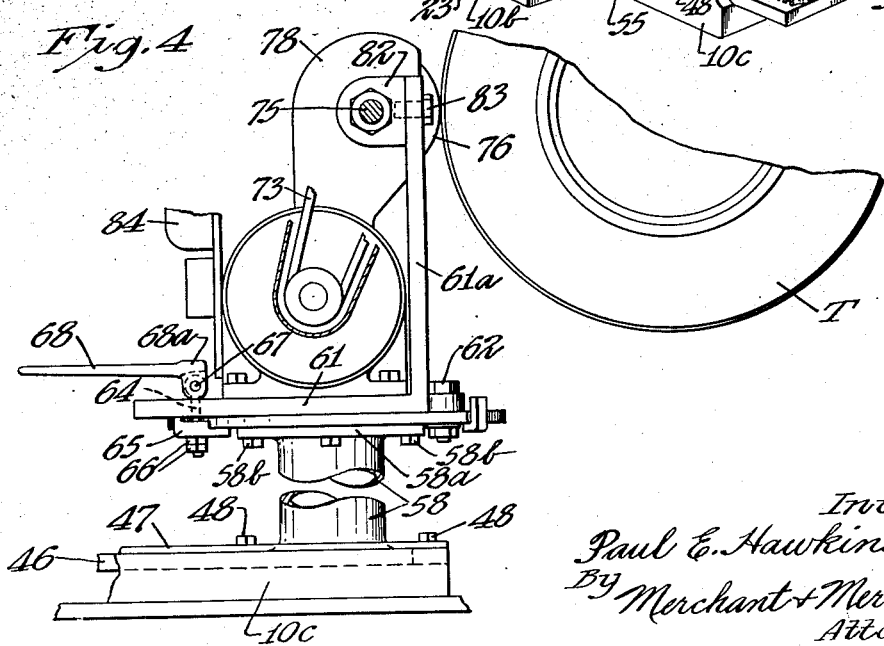
Inventor
Paul E. Hawkinson
By Merchant & Merchant
Attorneys

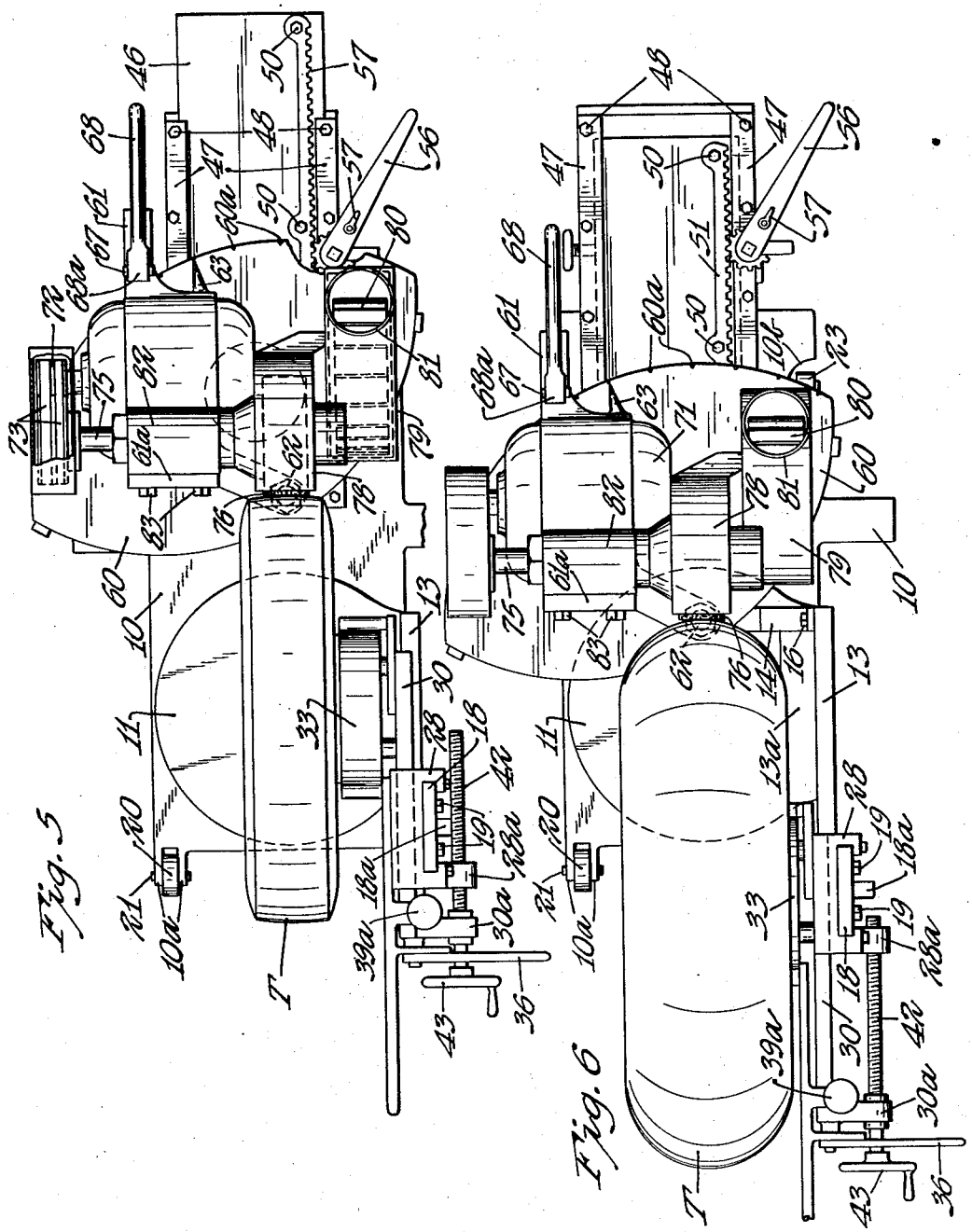

Patented Jan. 8, 1946

2,392,667

UNITED STATES PATENT OFFICE 2,392,667

TIRE BUFFING MACHINE

Paul E. Hawkinson, Minneapolis, Minn., assignor to Paul E. Hawkinson Company, Minneapolis, Minn., a corporation of Minnesota Application June 7, 1944, Serial No. 539,209

1 Claim. (Cl. 51—97)

This invention relates to a tire buffing or abrading machine and particularly to such a machine constructed and arranged to buff or finish a tire in connection with a retreading operation.

It is a common practice to buff or abrade a worn tire to bring the tread and shoulder portions thereof into the desired form and to true up said tread and shoulder portions before a new tread is placed on said tire. It is desired to bring the worn surface of the tread into slightly convex form and to true it up on the proper transverse arc or curve. This arc or curve will vary largely according to the transverse cross section and axial diameter of the tire casing and according to the tire pressure and the type of tire.

It is an object of this invention to provide a comparatively simple and efficient machine for supporting and positioning the tire to be treated, which machine also comprises a tire buffing or abrading wheel which is movable to different desired positions about the tire.

It is a further object of the invention to provide a tire buffing machine comprising a tire-carrying means rotatable about a horizontal axis, the same also being oscillatable about a vertical axis, means for varying the horizontal distance between said horizontal axis and vertical axis, a tire-buffing wheel movable toward the tread of the tire carried on said tire-carrying means and also being swingable about a vertical axis to be placed in different positions about the tread of said tire.

It is more specifically an object of the invention to provide a tire treating machine comprising a base, a turntable on said base rotatable about a vertical axis, a standard rising from said turntable, a slide movable horizontally relative to said standard, a rotatable tire-carrying means carried by said slide, a second slide mounted in said base, a post upstanding from said second slide, a tire buffing wheel mounted on said post and swingable about a vertical axis, and means for moving said second slide to move said buffing wheel toward and from the tread of a tire carried on said tire-carrying means.

It is still another object of the invention to provide a machine as set forth in the preceding paragraphs, said tire buffing wheel having a hood thereabout, a fan and fan casing to the inlet of which said hood is connected, a discharge conduit leading from said fan casing and means for driving said buffing wheel and fan, all mounted for movement about said vertical axis with said buffing wheel.

These and other objects and advantages of the invention will be fully set forth in the following description, made in accordance with the accompanying drawings in which the reference characters refer to the same parts throughout the different views and in which:

Fig. 3 is a perspective view showing the parts in different positions from those shown in Fig. 1;

Fig. 4 is a view partly in side elevation and partly in vertical section of the tire-buffing portion of the machine;

Fig. 5 is a plan view of the machine, some parts being broken away and others shown in horizontal section; and Fig. 6 is a plan view of the machine showing a different form of tire therein.

Figure 1:
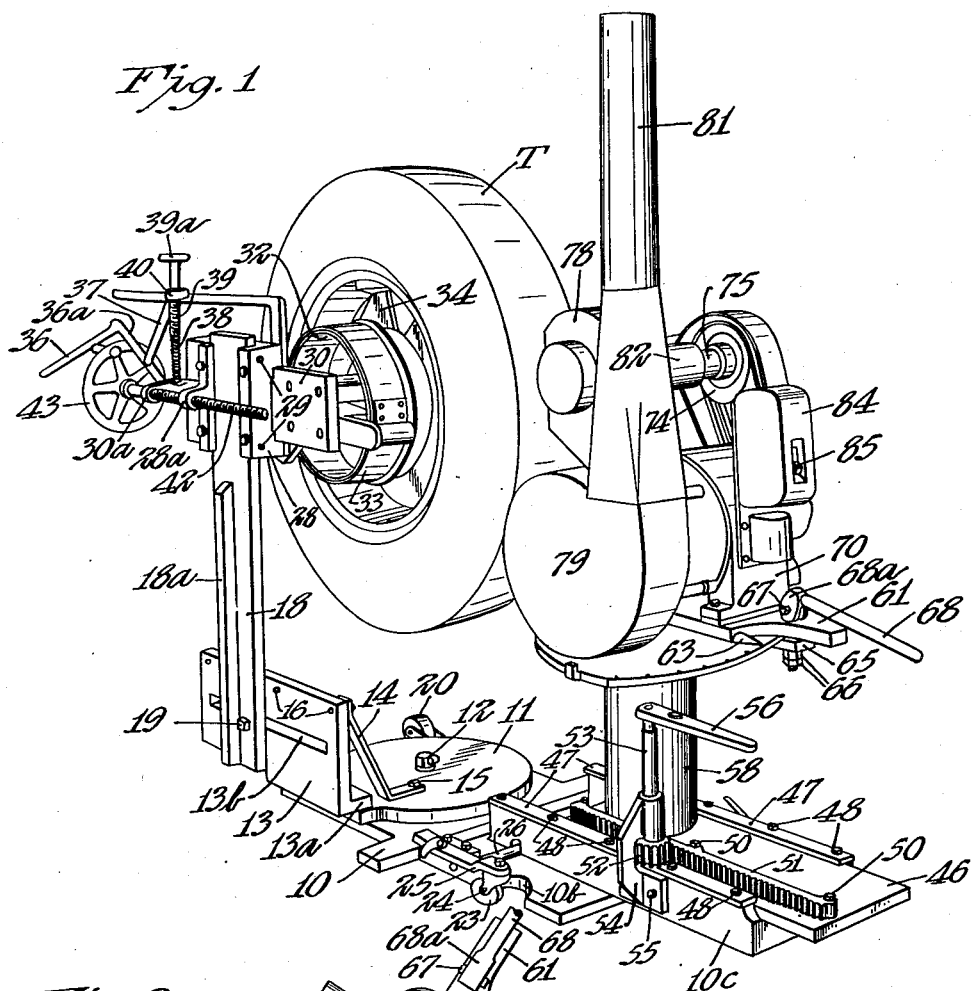
Fig. 1 is a perspective view of the machine.

Referring to the drawings, a machine is shown comprising a base 10. While this base could be variously made, it is shown as generally in the form of a plate and the same has mounted at one end thereof a turntable 11. Turntable 11 is rotatable about a central vertical axis and is connected to said base by a pivot bolt 12. Turntable 11 is of circular form for most of its extent but has one side projecting somewhat with a rectilinear edge and a bracket 13 is secured to said turntable at said side. Bracket 13 has a flange 13a at its bottom, extending horizontally and overlying turntable 11 and is secured to said turntable by a plurality of brackets or braces 14, having horizontal lower portions connected to the turntable by headed bolts 15. The upper ends of brackets 14 engage the vertically extending portion of bracket 13 adjacent to its top and are secured thereto by bolts 16. Bracket 13 has a slot 13b extending horizontally in the vertical portion thereof and a standard 18 has a flat side engaging the outer flat side of bracket 13 and is connected to said bracket by a headed bolt 19 passing through slot 13b. Standard 18 is of rectangular form in horizontal cross section and has a vertically extending strengthening rib 18a at its outer side. The base 10 has rollers 20 mounted on pins 21 at one end and at each side thereof and which are disposed between parallel projections 10a of said base. Adjacent the other end of said base, rollers 23 are provided, mounted on pins or bolts 24 extending transversely through the bifurcated ends of levers 25. Levers 25 are pivoted intermediate their ends on a cross shaft or rod 26, mounted in flanges upstanding from base 10. When the free ends of levers 25 are moved downwardly, as shown in Figs. 1 and 3, the rollers 23 will be raised and base 10 will be allowed to contact the floor or supporting surface. When said free ends of levers 25 are raised, the rollers 23 will be moved downwardly to support base 10. Base 10 is shown as being provided with arcuate recesses 10b to accommodate the movement of rollers 23.

Mounted on the standard 18 is a crosshead or block 28. Block 28 is movable on standard 18 and can be held in various fixed positions thereon by screws 29. Slide 30 fits in a groove in one side of block 28 and is movable therein in a direction at right angles to standard 18. Slide 30 has mounted thereon a brake drum 32, the periphery of which is engaged by a brake band 33. Slide 30 also has projecting therefrom and rigidly secured thereto, a spindle and a tire-carrying wheel 34 is rotatably mounted on said spindle. Brake drum 32 and wheel 34 are both rotatable on said spindle about a horizontal axis and said parts can be held stationary by the operation of brake band 33. This is accomplished through the moving of a lever 36 which straightens and releases a toggle formed by portion 36a of lever 36 and a link 37. The brake band 33 is movable against the drum 32 by the tension of a spring 38, the tension of which can be adjusted by a screw 39 secured to one end of said spring and movable in a nut 40 by its end wheel 39a. The slide 30 has an arm 30a projecting from one side and a screw 42 passes through said arm, said screw being provided with an operating handwheel 43. Screw 42 passes through a projection 28a of crosshead 28, which acts as a nut. Screw 42 is connected to the arm 30a so that rotation of handwheel 43 and screw 42 moves slide 30 transversely of the head 28. The parts so far described, including turntable 11 and parts carried thereby, are substantially the same as shown in applicant's prior Patent No. 2,254,526, granted September 2, 1941. To such patent reference is made for a more detailed description of said parts. Said parts, per se, naturally form no part of the present invention except as they cooperate in a new combination.

With the structure described and as clearly set forth in said patent, standard 18 may be adjusted to different positions on bracket 13 and held in the desired fixed position thereon. Crosshead 28 may be moved to and held in the desired position on standard 18. The tire-carrying means 34 can be moved to different positions in a horizontal line by the rotation of wheel 43. It will be seen that the relative position of the center or axis of tire-carrying means 34 and the axis of turntable 11 may be varied in a horizontal direction.

Base 10 has an end portion 10c secured thereto having a recess therein of substantially rectangular form and open at its top in which is disposed a slide 46. Slide 46 is held in place by the bars or guides 47 secured to the top of the side flanges of portion 10c by the headed bolts 48. Slide 46 carries and has secured thereto in any suitable manner, as by the headed bolts 50, a rack 51. Rack 51 is engaged by a pinion 52 carried on a shaft 53 which is journaled in a bracket 54, secured to the base portion 10c by bolts 55. Shaft 53, at its upper end, has a portion which is square or polygonal in transverse cross section and over which fits a ratchet lever 56. Ratchet lever 56 will be of the ordinary form, having a pawl 57 which can be set to have the ratchet in neutral or right and left operative positions so that pinion 52 will be moved by swinging lever 56 in one direction or the other. By operation of ratchet lever 56, pinion 52 can thus be rotated and rack 51 and slide 46 be moved away from or toward turntable 11. It will be noted that slide 46 moves in the same direction or in a direction parallel to slide 30. A post 58 is carried on slide 46 and upstands therefrom, the same having at its top a flange 58a shown as having a flat top surface. A plate 60 rests on and is secured to flange 58a by headed bolts 58b. Plate 60 is of general bicuspid form, having its sides formed by intersecting arcs of substantially the same radius. Plate 60 has formed along one side thereof, uniformly spaced graduations 60a. Mounted upon the top flat surface of plate 60 and resting thereon is a member 61. Member 61 is pivotally connected to plate 60 by a headed pivot bolt 62. Member 61 is swingable about the axis of bolt 62 and carries a pointer 63 which co-operates with graduations 60a. An eye-bolt 64 extends vertically through member 61 downwardly at one side of plate 60 and through a clamping plate 65, said bolt being equipped with nuts 66 below plate 65. A pivoted and headed bolt 67 extends through the eye of bolt 64 above plate 60, through the sides of the head 68a of a lever 68, which projects outwardly from member 61. The surface or periphery of head 68a about bolts 67 will be eccentric so that by swinging lever 68, plate 60 and member 61 can be clamped together. By swinging lever 68 upwardly member 61 can be released and can then be swung about the axis of bolt 62. Member 61 has mounted thereon a bracket or casing 70 which carries a motor 71, preferably of the electric type, which motor has secured to its driving or armature shaft, a pulley 72 over which runs a pair of belts 73, also running over a pulley 74 secured to a shaft 75. Shaft 75 has secured thereto a buffing or abrading wheel 76. Wheel 76 is surrounded, for most of its extent, by hood 78 which communicates with the intake side of a fan casing 79 in which is disposed a fan 80. Fan 80 is driven by the shaft of motor 71 and its casing 79 is provided with a discharge conduit 81 which may extend to any desired point, as to a point outside the room in which the machine is being used. Shaft 75 is journaled in a bracket 82 secured by bolts 83 to the upstanding side 61a of member 61. A switch box 84 is shown containing a suitable switch for motor 71 operable by handle 85 projecting through a slot or opening of box 84.

Figure 2:
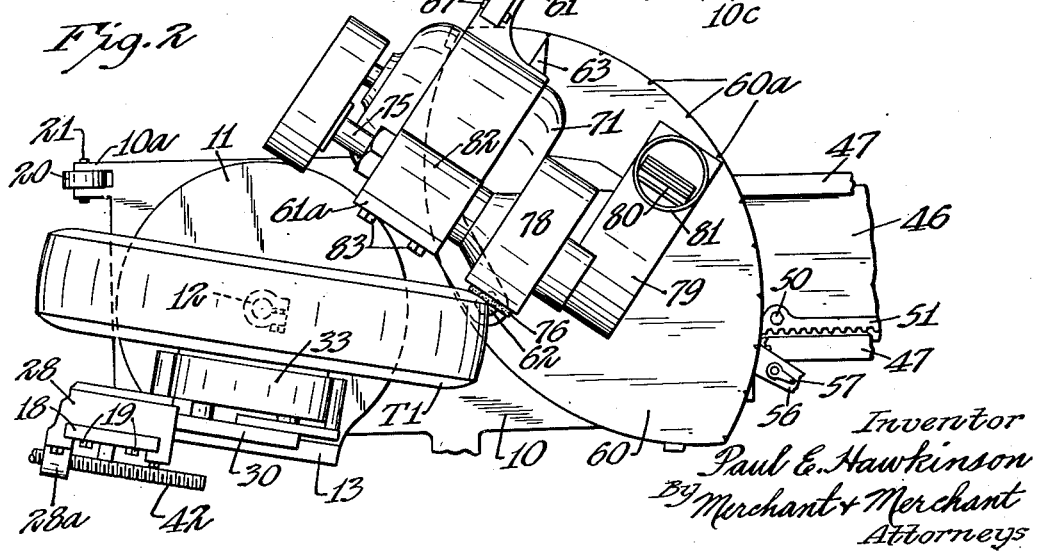
Fig. 2 is a plan view of the machine, some parts being broken away.

In operation, when a tire casing is to be treated it will be applied to the carrying wheel 34, which wheel is easily removable from the machine as set forth in said prior patent. Said wheel will then be placed on the machine as shown in Figs. 1, 3 and 5, and will be held thereon by suitable means, as also disclosed in said patent. During the buffing operation on the tire casing the latter will be held in inflated condition by the use of a properly air-charged inner tube. The crosshead 28 will be vertically adjusted on standard 18 so that the axis of the tire-carrying wheel 34 will be slightly below the horizontal plane intersecting the axis of buffing wheel 76. The wheel 43 will then be turned to move slide 30 on tire-carrying wheel 34 to the desired position relatively to the axis of turntable 11, so that when the turntable and tire are oscillated, the proper convex surface will be given to the tire casing tread. After the tire is so mounted and adjusted in position, the lever 56 will be operated to rotate pinion 52 and move slide 46 to bring buffing wheel 76 into the proper operative position relative to the tire. The tire is indicated by T in the different views. The switch 85 will be moved to start motor 71 and buffing wheel 76 and fan 80 will thus be driven. The buffing wheel 76 is driven so that it rotates counterclockwise as seen in Fig. 3. The member 61 will be swung to bring the wheel to the desired position for operating on the desired portion of the tire. When the tread of the tire is to be buffed or abraded, wheel 76 will be in the position shown in Fig. 5. The tire T will then be oscillated about the axis of turntable 11 and the proper arc or transverse curvature will be given to the tread. It will be seen that the relative position of the center of the tire and the vertical axis of turntable 11 will determine this arc or curvature of the tread. If it is desired to true up the sides of the shoulders T1 on the casing, the wheel 76 will be moved to the position shown in Fig. 2. The sides of the shoulders can thus be finished either in a flat annular surface or an arcuate surface as desired. The tire could be slightly swung about the axis or turntable 11 to give an arcuate finish. It is sometimes desired to true up and shape up the shoulders both before and after the new tread has been applied. The operator will be guided in positioning member 61 and wheel 76 carried thereby by the graduation 60a with which pointer 63 can be aligned. It will thus be seen tires of various types and sizes can be trued up to the desired shape or form. The standard 18 will be adjusted on plate 13 to accommodate tires of different types and sizes. As above stated, the arc to which the surface is finished can be determined by the positioning of the tire or its axis relative to the axis of turntable 11. As shown in Fig. 6, the axis of turntable 11 is substantially coincident with the axis of the semicircle forming the tire curvature. The tire could thus be finished in a true arc as shown in Fig. 6. Some extremely large tires used on heavy duty, road and other machines, are so finished. The material which is abraded from the tire will be drawn into hood 78 by fan 80, will pass through the fan casing 79 and be discharged through the discharge conduit 81. This material is mostly in the form of fine dust, so that instead of having a great cloud or mass of dust in the room, the dust and dirt are all dischaged so that the atmosphere in the room is kept clean. As stated, the base 10 can be moved on its rollers to the desired place in the shop and can be arranged to rest on the floor in a stationary position by operation of levers 25. As briefly described, and as fully set forth in said patent, the tire T can be held in stationary position by application of the brake band 33.

From the above description it will be seen that I have provided a novel and comparatively simple and highly efficient machine for acting on, abrading or buffing tire casings. The buffing wheel 76 and the tire-carrying means are all mounted on one base and are so arranged that they can readily be moved to position to secure the desired result on the tire casing. The treads of the casings can be finished to the desired shape. The treads of various makes and types of tires vary greatly in their shape or contour. The tire can be finished across the tread and around the sides and all of these parts trued up as desired, whether the tread and sides are in one arc or in different lines of arcs. The machine has been amply demonstrated in actual practice and found to be very successful and efficient.

It will, of course, be understood that various changes may be made in the form, details, arrangments and proportions of the parts without departing from the scope of applicant's invention, which, generally stated, consists in a machine such as shown and described, having the objects above set forth and defined in the appended claim.

I claim:

A machine of the class described having in combination, a base, a support on said base rotatable about a vertical axis, a standard carried by said support, means for carrying a tire casing rotatable about a horizontal axis carried by said standard, means for moving said last mentioned means to vary the distance between said horizontal axis and said vertical axis, a slide mounted on said base, means for moving said slide toward and from said vertical axis and substantially parallel to the movement of said first mentioned means, a post carried by said slide and upstanding therefrom, a plate carried at the top of said post, a support mounted on said plate and swingable about a vertical axis eccentric to the axis of said post, a motor mounted on said support, a buffing wheel on said support driven by said motor, a fan on said support driven by said motor, a casing surrounding said fan and having a portion largely surrounding said wheel, a conduit leading from said casing, means for swinging said support about said second vertical axis to position said wheel about the tread and shoulders of said casing and means for holding said support and parts carried thereby in stationary position.

PAUL E. HAWKINSON.